Jan. 24, 1928.
T. V. McDONALD
1,657,090
MOUNTING ARRANGEMENT FOR DUMP BODIES
Filed Oct. 15, 1926
2 Sheets-Sheet 1
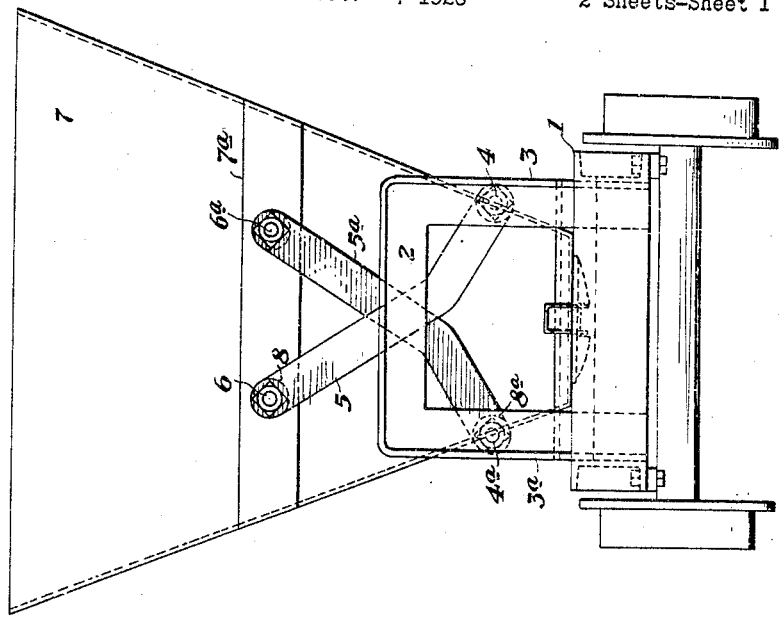
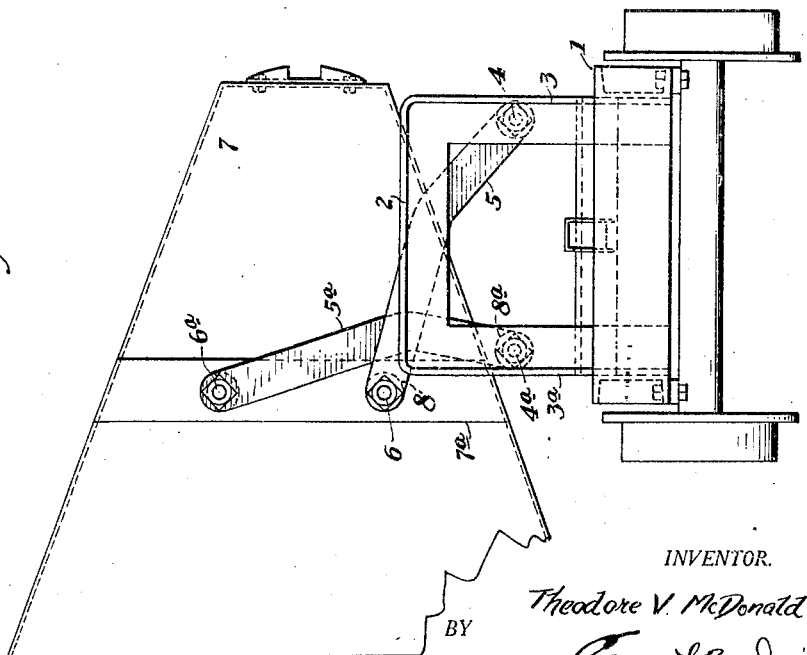
INVENTOR.
Theodore V. McDonald
BY
ATTORNEY.

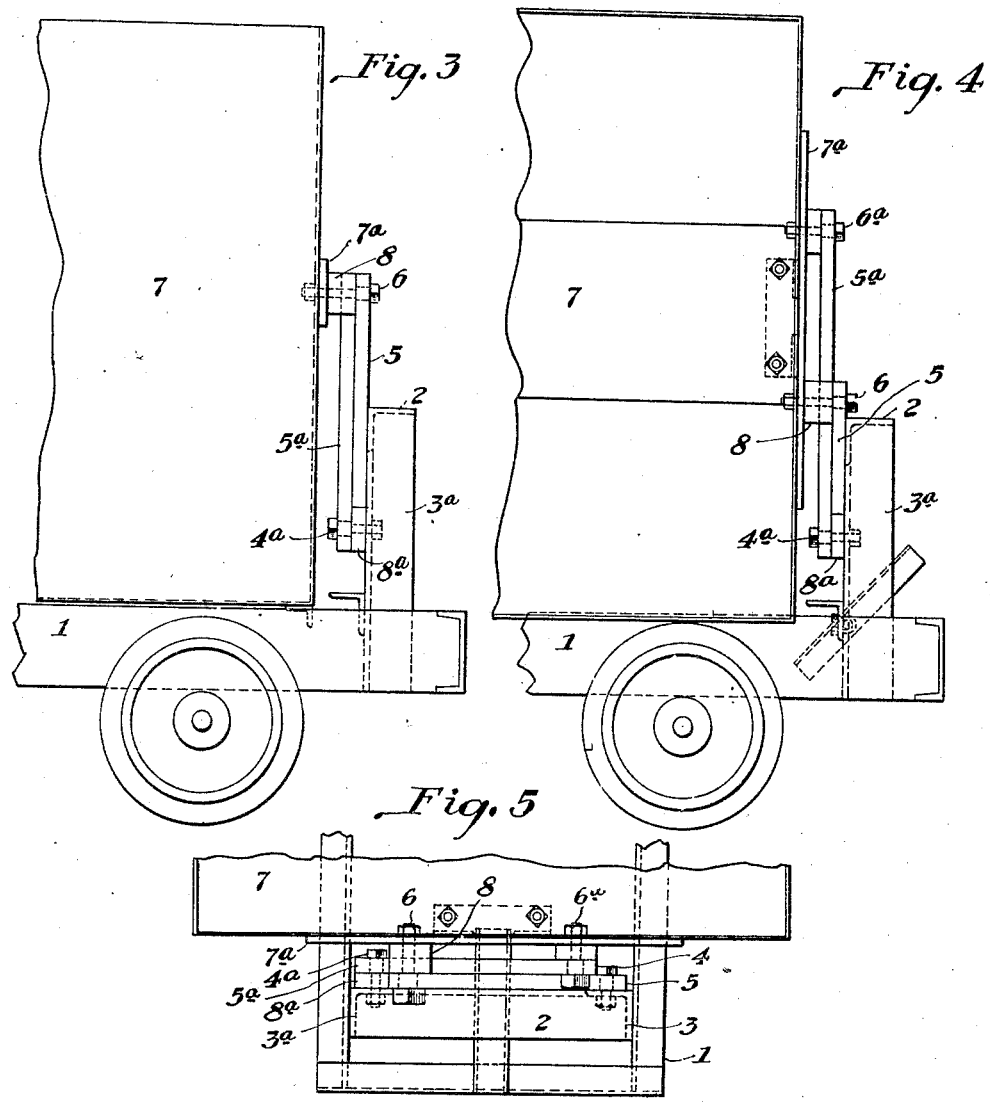

Patented Jan. 24, 1928.

1,657,090

UNITED STATES PATENT OFFICE.

THEODORE V. McDONALD, OF DETROIT, MICHIGAN, ASSIGNOR TO EPWORTH MANUFACTURING COMPANY, OF DETROIT, MICHIGAN, A CORPORATION OF MICHIGAN.

MOUNTING ARRANGEMENT FOR DUMP BODIES.

Application filed October 15, 1926. Serial No. 141,735.

It is an object of the invention to provide a mounting arrangement by which a dump body is so supported that its contents will be dumped clear of the track or runway along which the truck on which it is mounted travels, and also clear of the wheels of the truck.

Another object of the invention is to provide a mounting arrangement that will permit a dump body being tilted to a sufficient angle towards either side that the whole of the contents may be emptied.

A further object of the invention is to provide a mounting arrangement so designed that the dump body will tend to remain either in upright or any tilted position, and which can be either dumped or moved back into upright position with a minimum of effort.

With these and other objects in view which will become apparent as the specification proceeds, the invention is hereinafter more fully described with the aid of the accompanying drawings, in which:

Figure 1 illustrates an end elevation of a truck and dump body provided with my mounting means in upright position, and Figure 2 shows a similar view with the dump body in tilted position.

Figures 3 and 4 are partial side elevations of Figures 1 and 2 respectively.

Figure 5 is a plan view of Figure 3.

Insomuch that the mounting means for both ends of the dump body is identical only one end of a truck or frame and body is shown in the side elevations and plan view illustrated in Figures 3, 4 and 5. And in the description the mounting means at one end only is described as it is believed that the construction will be readily understood therefrom.

The truck or frame 1 may be of any desired construction. Towards its ends, and spaced somewhat further apart than the length of the dump body 7, supports 3 and 3ª are secured in any suitable manner. When the frame 1 is made of metal, as in the case shown in the accompanying drawings, the lower ends of the supports are usually welded in position. In order to brace the upper ends of the supports and hold them in spaced relation to one another, I usually connect them with a transverse member 2, which, in the present instance, is integral with their upper ends.

Through the supports 3 and 3ª bolts 4 and 4ª pass. These bolts 4 and 4ª, which should be substantially horizontally in line one with the other, support one end of the links 5 and 5ª respectively. The ends of the dump body 7 are generally reinforced transversely by a brace 7ª and through the end of the dump body and the brace projecting pins 6 and 6ª are arranged. These pins are so located as to be substantially in a horizontal plane when the body is in upright position and are substantially equidistant from the vertical centre line of the body. The opposite ends of the links 5 and 5ª are pivotally mounted on these pins 6 and 6ª in such a manner that the said links cross one another.

Usually bosses 8 and 8ª are provided one on each of the links 5 and 5ª, the former to form an offset end in proximity to the dump body to receive the pin 6, and the latter to form an offset end in proximity to the support 3ª to receive the bolt 4ª. The links are preferably flexed outwardly towards the sides of the body so that the latter may be tilted to a greater extent before the link attached to the raised side will strike the pin secured to and projecting from that side of the body which then happens to be downwardly inclined.

In the arrangement shown it will be noted that the centre of gravity of the body is at all times between the pins 6 and 6ª, which are preferably located slightly above the said centre of gravity when the body is in upright position. Moreover the weight of the body is distributed between the supports 3 and 3ª so that very slight pressure exerted against either side of the body will cause it to tilt in the desired direction.

While in the foregoing the preferred embodiment of the invention has been described and shown, it is understood that the construction is susceptible to such modifications as fall within the scope of the appended claims.

What I claim is:

1. In a dump body mounting arrangement, the combination of a dump body, two mounting means at each end of said body one on each side of the centre line of the latter, a frame, two supports on each end of said frame one on each side of the centre line of said body when the latter is in upright position, transverse members connecting the upper ends of each pair of supports, a link pivotally attached to each of said mounting means, each support having one of said links pivotally fastened to it so that the two links at each end of the body cross one another.

2. In a dump body mounting arrangement, the combination of a dump body having two projecting pins in each of its ends, said pins being located substantially equidistant from the centre line of said body and all being in substantially the same horizontal plane when the body is in upright position, a frame, two supports on said frame at each end of the latter, a transverse member connecting the upper ends of each pair of supports, a link pivotally attached to each of said pins, each support having one of said links pivotally fastened to it so that the two links at each end of the body cross one another at all positions of said body, and each of said links being flexed intermediately of its length.

THEODORE V. McDONALD.